United States Patent

Demoisson et al.

Patent Number: 5,219,189
Date of Patent: Jun. 15, 1993

[54] COMPOSITE GASKET FOR THE LOCKED ASSEMBLY OF SPIGOT AND SOCKET PIPES

[75] Inventors: Jacques Demoisson, Loisy; Michel Hussard, Pont-A-Mousson; Alain Percebois, Blenod les Pont-a-Mousson, all of France

[73] Assignee: Pont-A-Mousson S.A., Nancy, France

[21] Appl. No.: 821,287

[22] Filed: Jan. 10, 1992

Related U.S. Application Data

[63] Continuation of Ser. No. 623,006, Dec. 6, 1990, abandoned.

Foreign Application Priority Data

Dec. 11, 1989 [FR] France .................. 89 16524

[51] Int. Cl.⁵ ............................................. F16L 21/08
[52] U.S. Cl. ........................... 285/105; 285/231; 285/374
[58] Field of Search ............... 285/104, 105, 231, 340

[56] References Cited

U.S. PATENT DOCUMENTS

| | | | |
|---|---|---|---|
| 3,963,298 | 6/1976 | Seiler | 285/105 |
| 4,229,026 | 10/1980 | Seiler | 285/105 |
| 4,848,805 | 7/1989 | Bucha et al. | 285/105 |

FOREIGN PATENT DOCUMENTS

| | | | |
|---|---|---|---|
| 2606643 | 8/1977 | Fed. Rep. of Germany | 285/105 |
| 623006 | 6/1967 | France . | |
| 580046 | 7/1958 | Italy | 285/105 |
| 618723 | 3/1961 | Italy | 285/104 |

Primary Examiner—Dave W. Arola
Attorney, Agent, or Firm—Sughrue Mion Zinn Macpeak & Seas

[57] ABSTRACT

Composite gasket for locked assembly between a first pipe T1 with a socket 15 and a second pipe T2 with a spigot 20.

The gasket G comprises locking inserts 7 with a nose 11 for catching on the spigot 20. The inserts 7 are capable of an angular movement varying their inclination relative to the axis X—X of the gasket G.

The invention is used for the locking of pipes having wide diametral production tolerances.

12 Claims, 4 Drawing Sheets

COMPOSITE GASKET FOR THE LOCKED ASSEMBLY OF SPIGOT AND SOCKET PIPES

This is a continuation of U.S. patent application No. 07/623,006 filed Dec. 6, 1990 and now abandoned.

The present invention relates to a composite gasket for the locked assembly of coaxial spigot and socket pipes, the assembly being telescopic.

More particularly, it is concerned with a composite gasket, in the elastic body of which are embedded a particular number of inserts for locking the spigot of one pipe relative to the socket of another pipe, the gasket being compressed radially between the spigot and the socket.

In the assembly, each locking insert made of hard material is buttressed at a particular inclination between the socket of a first pipe and the spigot of a second pipe.

Such a locking prevents the axial movements of one pipe relative to the other which could compromise the effective sealing of the gasket and even disconnect the initially assembled pipes completely under the action of the axial separating forces generated by the pressure of the fluid contained in the pipes.

This locking advantageously replaces a costly system for fastening a pipeline to foundations anchored in the ground.

The patent FR 1,490,680 discloses a composite gasket equipped with locking inserts and a telescopic locked assembly of the abovementioned type. According to this patent, each insert, at a fixed and low inclination relative to the axis of the gasket or at an inclination which is variable between narrow limits permitted by an orifice passing through the socket, catches on a circular groove which is made on the spigot of one pipe. According to one embodiment, each insert is produced in the form of a finger screwable into a nut embedded in the gasket, in order to modify the effective length of the locking finger in the event that pipes of large diameter are not strictly in alignment.

In view of the low inclination of the locking inserts which makes it necessary for them to bear on the spigot by means of a circular groove, and in view of the narrow limits of angular movement of the said inserts, the diametral tolerances of the spigots of the pipes lockable in this way are likewise narrow.

The Applicant Company set itself the problem of ensuring a buttressing of each insert on the spigot, without making a groove on the spigot and without varying the length of the insert, whilst at the same time ensuring an effective locking with the widest possible diametral tolerances of the spigot.

This problem is solved by means of the composite gasket of the invention.

The subject of the invention is, therefore, a composite gasket having the characteristics of claim 1.

Due to its possibilities of angular movement in relation to the gasket in which it is embedded, each insert can adapt to variations in diameter of the spigot or of the socket of a pipe, also called diametral tolerances, that is to say to a variable annular play between spigot and socket, to obtain the optimum buttressing inclination. Thus, depending on the diametral tolerances encountered, a single optimum insert length is sufficient to obtain a good locking of the spigot of one pipe relative to the socket of the other pipe.

Another subject of the invention is a locked telescopic sealing assembly between two pipes by means of the abovementioned composite gasket, according to the characteristics of claims 9 and 10.

Thus, with a small annular play between the assembled pipes, the insert behaves as though it had a small length, and with a large annular play the insert behaves as though it had a large length. This is obtained by means of an optimum inclination of the insert which rotates about a first theoretical rotational pivot in relation to the socket for a first tolerance range and about a second theoretical rotational pivot for a second tolerance range.

Further characteristics and advantages will emerge from the following description made with reference to the accompanying drawings which are given purely by way of non-limiting examples and in which.

Figure 2:
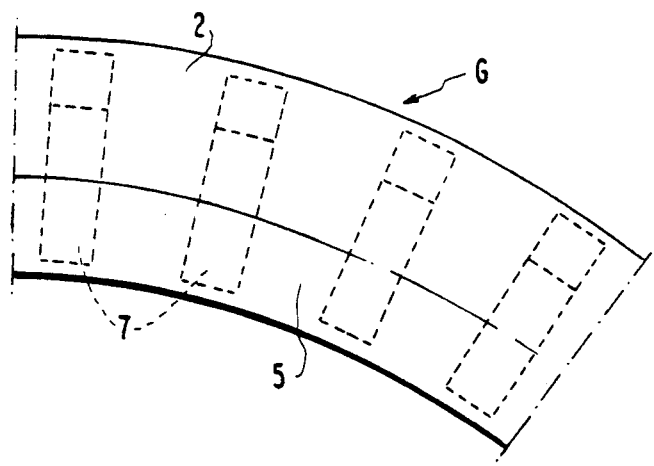
FIG. 2 is a partial view of the gasket according to the line 2—2 of FIG. 1.
Figure 1:
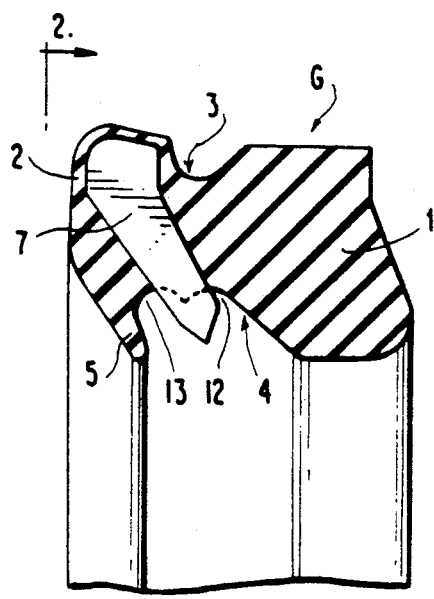
FIG. 1 is a partial mid-section through the composite gasket of the invention.
Figure 3:
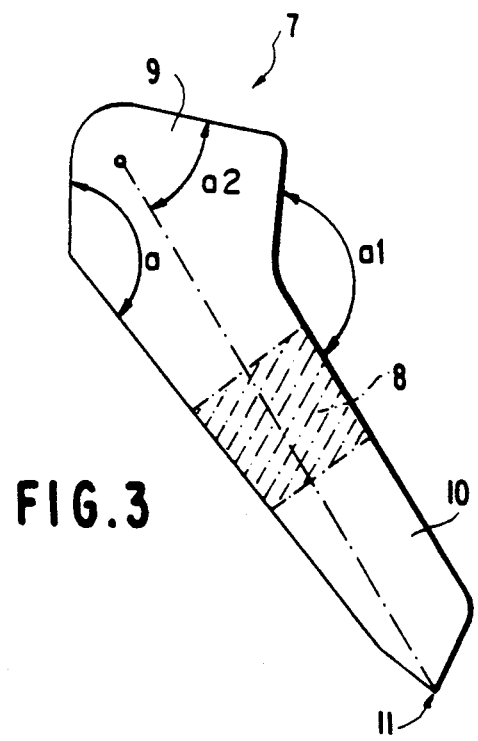
FIG. 3 is a front view of a single insert on a larger scale than FIGS. 1 and 2.
Figure 4A:
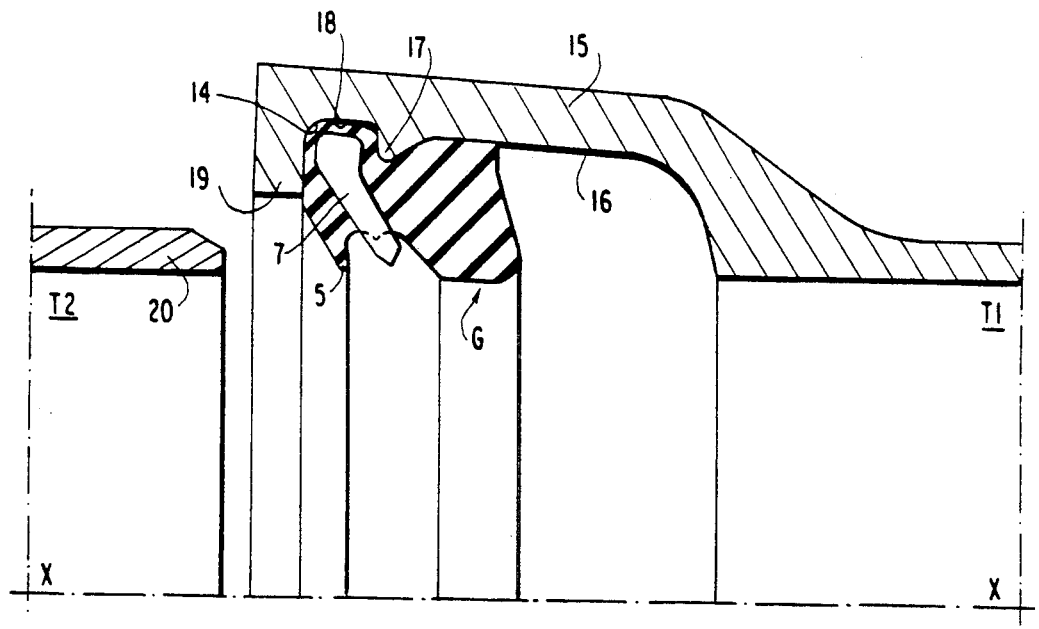
Figure 4B:
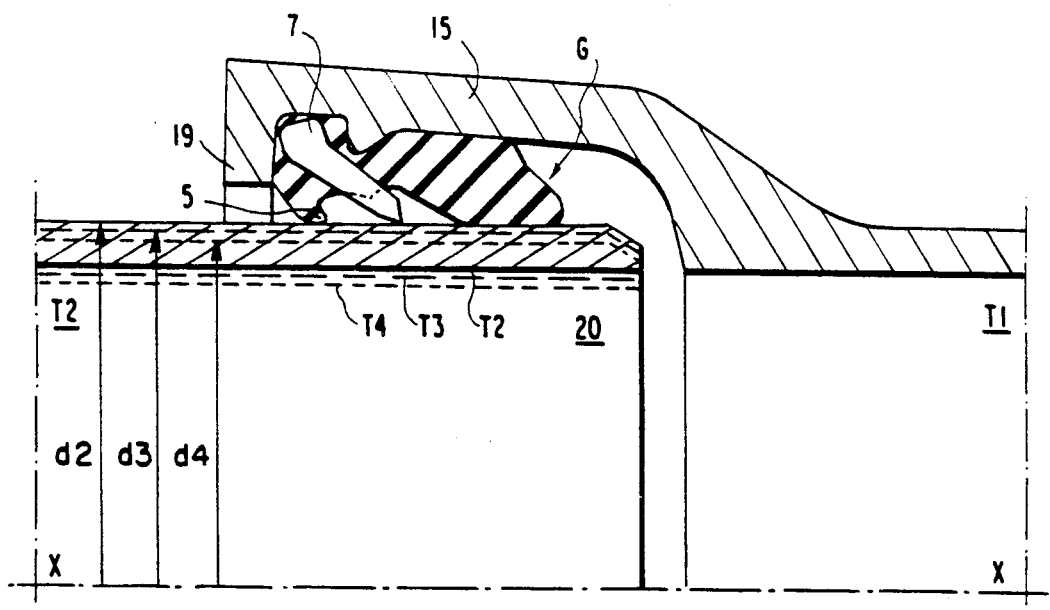
Figure 7:
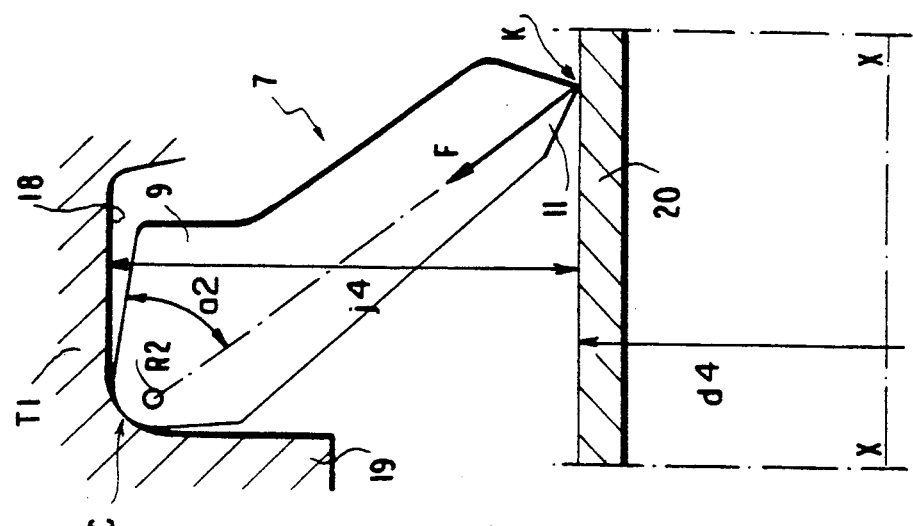
Figure 6:
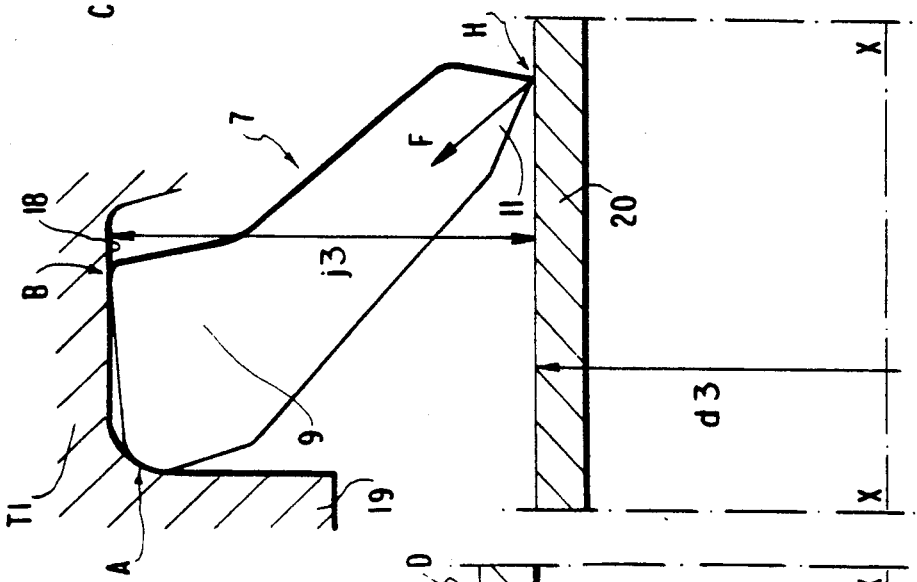
Figure 5:
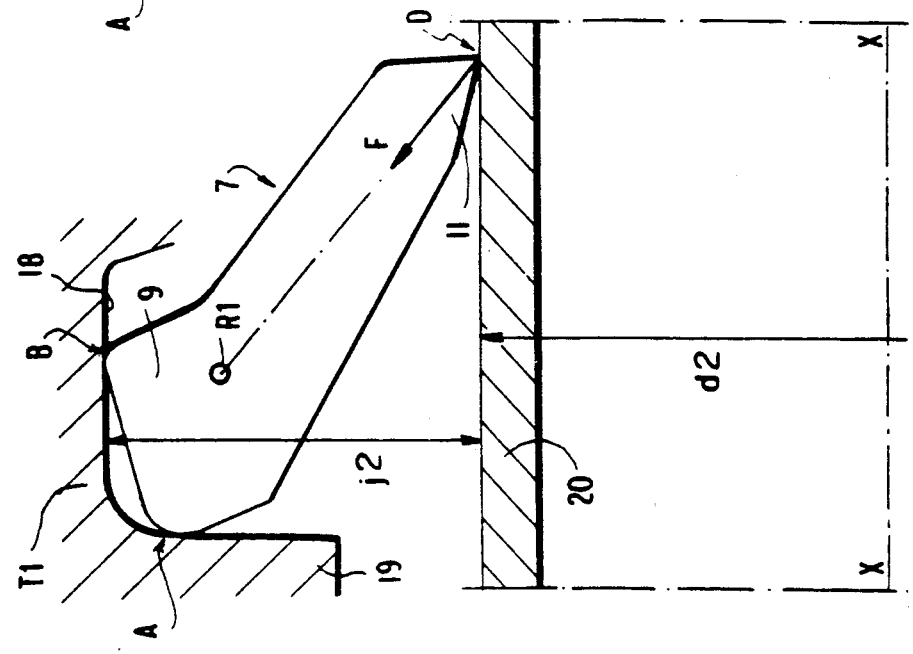
Figure 8:
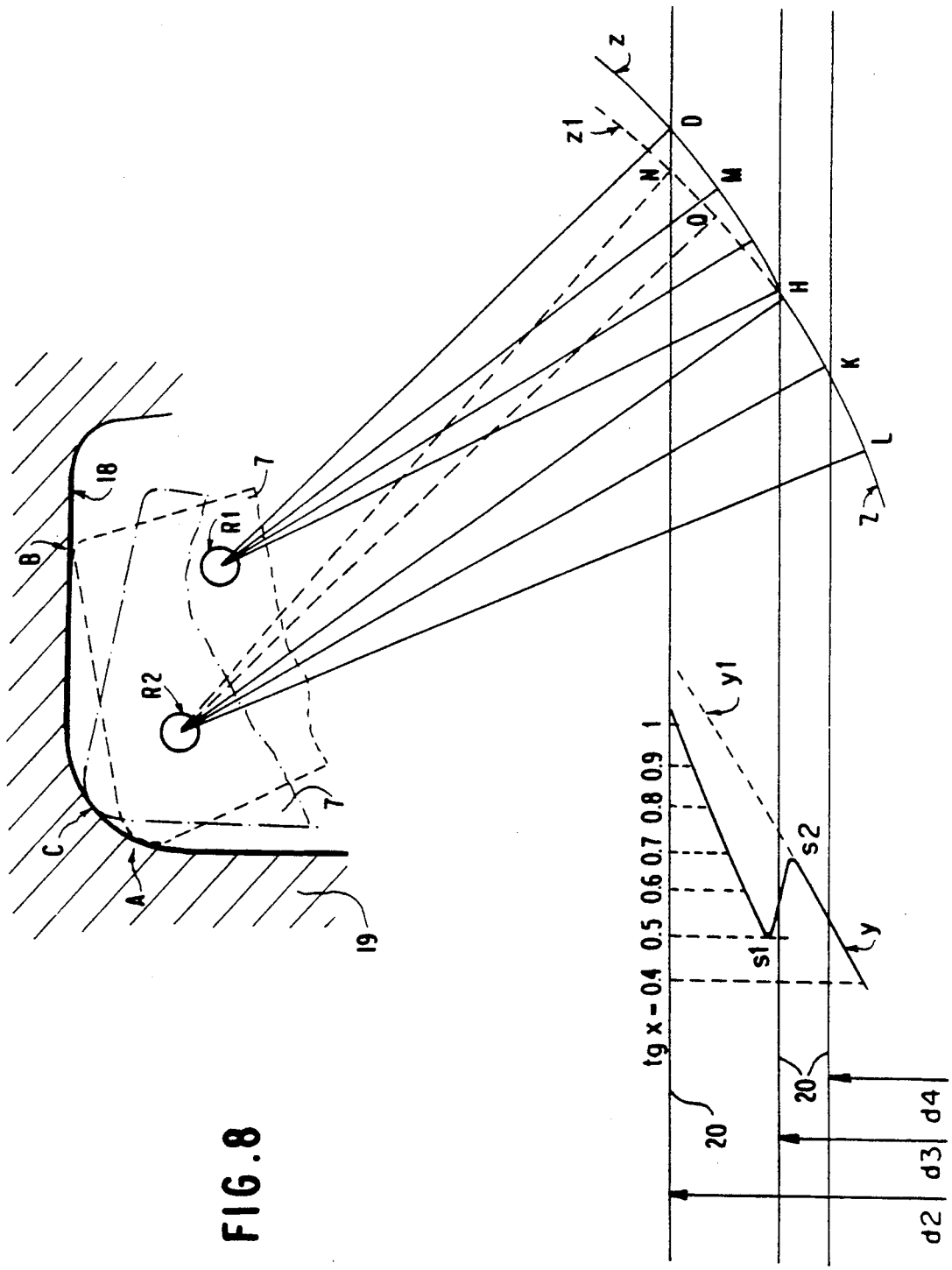

FIGS. 4A and 4B are mid-sectional views, on a smaller scale than FIGS. 1 and 2, of two pipes and of the composite gasket interposed between them, respectively before and after the locked assembly of the invention has been carried out, FIGS. 5, 6 and 7 are partial mid-sectional views, on a large scale, illustrating different positions of the insert for different annular plays between the socket and the spigot of two pipes, FIG. 8 is a geometrical diagram, on a large scale, illustrating different inclinations of the reaction of the spigot on the insert for different annular plays, the trend curves of the contact points of the insert with spigots of different diameters, and tangents of the reaction angles for each inclination of the insert.

According to the exemplary embodiment in FIG. 1, the invention is used with a gasket G of axis X—X. Its mid-section comprises an annular solid body 1 made of elastomer and an annular heel 2 likewise made of elastomer. The body 1 and the heel 2 are separated by a peripheral circular groove 3 and by an inner circular groove 4. The inner groove 4 is limited on the heel 2 side by an inner circular lip 5 which is oblique relative to the axis X—X. The elastomeric lip 5, which is thin and flexible, converges towards the axis X—X near to the minimum inside diameter of the solid body 1.

The gasket G comprises a particular number of inserts 7 made of extruded or sintered material of great hardness, for example of hard metal alloy or of ceramic. The inserts 7 are uniformly distributed over the entire circumference of the gasket G. Each insert 7 is a body of rectangular cross-section 8 and of bent profile and is composed of an approximately rectangular wide head 9 and of an elongate body 10 forming two obtuse deflection angles a and al relative to the said head 9. Each head 9 and a large part of each body 10 are embedded in the annular heel 2 of the gasket G and are covered with the elastic material of the heel 2. The nose 11 and part of the body 10 project towards the axis X—X of the gasket G in relation to the inner circular groove 4 of the said gasket G.

The inner groove 4 comprises an oblique flank adjacent to the solid body 1 and an oblique flank consisting of the oblique lip 5. Two annular spaces 12 and 13 are formed between an insert 7 and each of these oblique flanks.

The composite gasket G with inserts is intended to be mounted between two pipes T1 and T2, for example made of nodular graphite iron. One of the pipes T1 with a socket 15 comprises successively, in the axial direction from the bottom towards the entrance of the said socket 15, an annular chamber 16 for the movement of the spigot of the other pipe, a circular stop 17 projecting internally relative to the chamber 16, a circular chamber 18 for receiving a heel 2 of a gasket G, and a circular entry flange 19 limiting the groove 18, of an inside diameter substantially smaller than that of the stop 17. The entry flange 19 is connected to the groove 18 by means of a rounded surface 14.

The other pipe T2 with a cylindrical spigot 20 is produced with diametral tolerances corresponding to a maximum outside diameter d2, a medium outside diameter d3 and a minimum outside diameter d4. The pipes of outside diameters d3 and d4 are designated respectively by T3 and T4 in FIG. 4B.

For their assembly, the pipes T1 and T2 are brought close to one another and aligned according to axis X—X (FIG. 4A). The gasket G is introduced into the socket 15 of the pipe T1, the body 1 taking its place in the chamber 16 and the heel 2 fitting into the receiving groove 18, the axis X of the gasket G coinciding with that of the pipes T1 and T2.

The spigot 20 of the pipe T2 is then introduced through the gasket G, first moving aside the lip 5 which is laid with some pressure on to the outer surface of the spigot 20. When the spigot 20 crosses the threshold of the inserts 7, these are inclined as a result of angular movement in the space 12 towards the body 1. The introduction of the spigot 1 is continued until its end edge comes near to the bottom of the chamber 16. The spigot 20 is then returned axially rearwards so as to cause the inserts 7 to be turned back. The inserts 7 change their inclination relative to the axis X—X as a result of an angular movement counter to the preceding one and of small extent in the space 13 towards the circular lip 5. During this turning back, the noses 11 of the inserts 7 catch on the outer surface of the spigot 20 and thus offer appreciable resistance to the continuation of the axial withdrawal movement of the spigot 20. The locking of the telescopic assembly of the pipes T1 and T2 is achieved.

The operation of the device according to the invention with respect to the particular diametral tolerances will now be described.

After the abovementioned angular movements during the assembly of the pipes T1 and T2, each insert 7 assumes different bearings and inclinations according to the diameter d2, d3 or d4, in the locking position.

In the case of a minimum diameter d4 providing a maximum annular play j4 between the spigot 20 and the groove 18 of the socket, the nose 11 is in contact with the spigot 20 at a point K. The head 9 bears on the groove 18 at a single point C. The median line of inclination of the insert 7 serving as a support for a reaction force F of the insert 7 against the spigot 20 then passes through a theoretical rotational pivot R2. In this case, the inclination of the insert 7 relative to the axis X—X is the highest, the locking still being good.

In the case of a maximum diameter d2 providing a minimum annular play j2 between the spigot 20 and the groove 18 of the socket, the nose 11 is in contact with the spigot 20 at a catching point D, the head 9 bearing on the groove 18 at two points A and B.

The intersection of the perpendiculars to the two contact points A and B determines a new theoretical pivot R1 which is further from the face 19 than the pivot R2 and of which the straight-line segment joining it to the point D serves as a support for the reaction force F. In this case, the inclination of the insert 7 relative to the axis X—X is the lowest, a good locking of the spigot being ensured at the same time.

Between these two extremes there is a characteristic medium diameter d3 which provides a medium annular play j3 between the spigot 20 and the groove 18 of the socket, the nose 11 being in contact with the spigot 20 at a catching point H, and the head 9 bearing both on the rounded surface 14 extending the entry flange 19 and the groove 18. In this case, the inclination of the insert 7 is intermediate between those of the two preceding cases.

As shown in FIGS. 5 and 6, this transfer point is determined by the value of an angle a2 between a line joining the pivot R1 and the end of the nose 11 and an upper face of the head 9 opposite the groove 18 of the socket.

It emerges from these three cases that, to obtain the best possible locking, the reaction angle x, which is that of the abovementioned reaction force F with the perpendicular to the generatrix of the spigot 20 at the contact point D, H or K, must be between particular limits which depend on the desired locking force, on the material of the pipes T1 and T2 and on the surface state of these pipes.

So that there is a locking of the spigot 20 of the pipe T2 relative to the socket 15 of the pipe T1, the insert 7, which bears with its head 9 on the groove 18 of the socket, must exert a reaction force F towards the spigot 20. The force F is directed along a straight-line segment joining the catching point of the nose 11 on the spigot 20 to the theoretical rotation al pivot R1 or R2.

The reaction force F forms an angle x with the perpendicular to the generatrix of the spigot 20 at the contact point D, H or K.

If the reaction angle x is large, the component of the force F parallel to the axis X—X predominates over its component perpendicular to the axis X—X, thus theoretically being conducive to a good locking. Nevertheless, to allow an effective catching of the nose 11 against the outer surface of the spigot 20, it is expedient if the angle x of the reaction F does not exceed a particular maximum limit, beyond which the insert 7 no longer catches on the outer surface of the spigot 20 and simply slides against it.

Conversely, if the reaction angle x is small, the horizontal component of the reaction force F becomes negligible in relation to its component perpendicular to the axis of the spigot, and therefore, although the nose 11 actually penetrates the surface of the spigot 20 in this case, the force F cannot effectively oppose a push of the pipe T2 relative to the pipe T1 along the axis X—X and therefore cannot oppose a retraction movement.

In FIG. 8, other contact points of the noses 11 with the outer surface of the spigots 20 are marked at M and L for diameters larger than d3 and smaller than d4 respectively. The theoretical pivots R1 (where there are two bearings A and B of the head 9 on the groove 18) and R2 (where there is a single bearing C of the head 9 on the groove 18) are the zones where the centers of rotation of an insert 7 are situated in the course of an angular movement during the locking withdrawal of the spigot 20. Radii of rotation joining R1 or R2 at different contact points of a nose 11 with the spigot 20 at D, H, K, M and L serve to support the reaction forces F on the insert 7.

A curve z joins the various contact points D, H, K, M and L of a nose 11 with the outer surface of a spigot 20, the diameter of which varies according to the production tolerances.

A curve y represents the variation s of the tangent of the angle x, tg x, as a function of the diametral tolerance of the spigot, that is to say of the annular play j2, j3 and j4. The curve y has two abrupt changes of direction, or turnings back, at s1 and s2 located in the vicinity of the diameter d3. It is appropriate to note, in this respect, that tg x must not be considered similar to a coefficient of friction.

Thus, when the annular play decreases, that is to say when the diameter of the spigot increases, tg x, hence x, increases to the point s2. This is still true between a diameter passing through the point s1 and the diameter d2 corresponding to the minimum play j2. In contrast, between the points s2 and s1 there is a reversal in the trend of tg x which decreases. This reversal corresponds to an intermediate phase where the insert 7 no longer has a single contact point C against the inner surface of the socket and does not yet have a bearing point A against the entry flange 19 and a bearing point B against the groove 18. In this intermediate phase, the insert 7, which already has a bearing point B against the groove 18, still has a bearing point A against the rounded surface 14. In this case, the perpendicular to the contact point A is not parallel to the perpendiculars to the entry flange 19, thus shifting the position of the pivot and therefore the angle x of the reaction force. This is what is shown in FIG. 6.

In FIG. 8, a generatrix of the spigot 20 has been graduated according to tg x from 0.4 to 1. Projecting each point of the curve y on to the generatrix thus graduated results in the value of tg x, from which the value of x can be deduced for a diameter of the spigot 20 passing through the particular point of the curve y.

For example, for the points D, M and K, the curve y gives respective values of tg x higher than 1 (x=46°), between 0.7 and 0.8 (x=37°) and between 0.5 and 0.6 (x=29°).

By way of comparison, broken lines illustrate the radii of rotation of an insert of a type known from the patent FR 1,490,680 and the catching points n, Q and H of the said insert on spigots of different diameters.

The reaction forces V of the spigot on the insert are marked on the radii of rotation passing through a single pivot R2, since there is only a single contact point between the insert and the socket. A curve z1 joins the contact points N, Q and H. Likewise, a curve y1 represented by broken lines illustrates the value of tg x of this solution. It thus emerges that the possibilities of angular movement of an insert according to the patent FR 1,490,680 are more limited than those of the inset 7 of the invention, and the diametral tolerances acceptable with a known insert are lower than in the invention, this improvement arising from the transfer of the pivot R2 towards the pivot R1 in the vicinity of the diameter d3. The improvement in relation to the prior art can be summarized by the appearance of the contact point B against the groove 18 of the socket, this tending to lay the insert 7 on to the spigot, thus making it easier for it to catch, despite a small diametral play and therefore a small inclination of the insert 7 in relation to the axis X—X.

The inserts 7 reinforce the creep strength of the gasket G and prevent it from being expelled towards the outside of the socket 15 when the pipeline contains a fluid under high pressure. The insets 7 improve the anchorage of the heel 2 of the gasket G in the socket groove 18.

Due to the angle a1, the face 9 of the insert 7 is virtually perpendicular to the axis X—X and parallel to the opposite face of the stop 17 of the socket.

By virtue of their inclination relative to the axis X—X in the free state (FIGS. 1 and 4A) and their flexibility of inclination or of angular movement, allowed by the non-compressed elastic mass of the body 1 and by the flexible lip 5, the inserts 7 offer only slight resistance to the penetration of the spigot and make easier the axial introduction of the spigot 20 of the pipe T2 into the socket 15 of the pipe T1 (FIG. 4A) and its slight axial withdrawal as far as the optimum locking inclination.

The anchoring zone of the noses 11 of the inserts 7 on the spigot 20 is protected against attacks from external fluids by the lip 5 of the gasket G (FIG. 4B) which completely closes the entrance of the socket 15.

As a result of the variation of the bearing contacts of the insert 7 on the socket groove 18 (FIGS. 5 to 7), that is to say because of the possibility of passing from one bearing point C to two bearing points A and B and the resulting change of the rotational pivot R1, R2 as a function of the outside diameter d2, d3, d4 of the spigot 20 of the pipe T2 to be locked, the reaction angle x shifts about an optimum value, allowing an effective locking over a wide range of diametral tolerances of the spigot 20 between d2 and d4.

Owing to the variation of the bearings of the head 9 on the groove 18 (FIGS. 5 to 7) and the resulting shift of the theoretical pivot R1, R2, the insert 7 behaves, with small annular plays (j2), as though it had a small length and a high inclination, allowing an easy catching of the nose 11, whilst with large annular plays (j4) the insert 7 behaves as though it had a large length and a low inclination which likewise ensures an effective locking.

Finally, the diametral tolerances, that is to say the range of diameters (d2, d3, d4), of lockable pipes T2 is widened substantially.

If the range of diameters of lockable pipes, hence the diametral tolerances, is to be widened still further, instead of a single series of inserts 7 a second series of inserts of a length different from that of the inserts 7 and alternating with these is used.

We claim:

1. A composite gasket (G, G1) for telescopically securing a first pipe (T1) having a socket (15) to a second pipe (T2) having a spigot (20), said gasket (G, G1) adapted to be positioned within said socket to receive said spigot, and comprising:
   a body portion (1);
   an annular heel (2) made of elastic material; and
   a plurality of inserts (7) made of a material having a greater hardness than said heel and being embedded in the annular heel (2) along the generatrices of a cone having the same axis (XX) as the gasket (G, G1), each insert (7) having a distal end projecting from the gasket (G, G1) towards the axis (XX) of the latter, each insert (7) being equipped with a nose (11) at said distal end for catching on said spigot (20) of said second pipe and means for pivoting each of said inserts about two pivot axes which are displaced from one another while simultaneously bearing on said body portion (1) of the gasket (G, G1), during the insertion of the spigot (20) in said gasket such that said gasket can receive and lock spigots having various diameters.

2. Composite gasket (G, G1) according to claim 1, wherein each insert (7) has a transverse rectangular angled section.

3. Composite gasket (G, G1) according to claim 1, wherein each insert (7) includes a wide head (9) seated in the annular heel (2) of the gasket (G, G1), an elongate body (10) passing through the said heel obliquely relative tot eh axis (XX) of the gasket and forming an obtuse deflection (a, a1) relative to the head (9).

4. Composite gasket (G, G1) according to claim 1, wherein the end (9) of each insert (7) embedded in the annular heel (2) of the gasket (G, G1) is completely covered with the elastic material of the gasket (G, G1).

5. The gasket of claim 1, wherein each of said inserts has only one nose at said distal end.

6. A composite gasket (g, G1) for telescopically securing a first pipe (T1) having a socket (15) and a second pipe (T2) having a spigot (20), said gasket (G, G1) adapted to be positioned within said spigot and comprising:
   a body portion (1);
   an annular heel (2) made of elastic material;
   a plurality of inserts (7) made of a material having a greater hardness than said heel and being embedded in the annular heel (2) along the generatrices of a cone having the same axis (XX) as the gasket (G, G1), each insert (7) having a distal end projecting from the gasket (G, G1) towards the axis (XX) of the latter, each insert (7) being equipped with a nose (11) at said distal end for catching on said spigot (20) of said second pipe (T2), and being capable of angular movement while simultaneously bearing on said body portion (1) of the gasket (G, G1), during the positioning and locking of the spigot (20) in said gasket; and
   an oblique annular lip (5) extending inwardly from said heel and converging towards the axis (XX) of the gasket at least as far as the minimum inside diameter of the solid body portion (1) of the gasket (G, G1), said lip (5) forming with said body portion (1) an inner annular groove (4), into which the nose of each insert (7) protrudes.

7. Gasket (G, G1) according to claim 6, wherein said oblique annular lip (5) and each insert (7) have approximately the same inclination relative to the axis (XX) of the gasket.

8. Gasket (G, G1) according to claim 6, wherein said inner annular groove (4) includes a first oblique surface adjacent to said body portion (1) and a second oblique surface adjacent said oblique lip (5), an annular space (12) being formed between each insert (7) and said first oblique surface while another annular space (13) is formed between each insert (7) and said second oblique surface.

9. A locked telescopic sealing assembly between first and second coaxially disposed pipes (T1 and T2), the first pipe (T1) having a socket (15) and the second pipe (T2) having a spigot (20) penetrating into the socket (15), at the same time radially compressing a composite gasket (G, G1) having a body portion (1), an annular heel (2) connected to said body portion (1) and a plurality of inserts (7) each having a head at one end thereof embedded in said annular heel (2) and having a nose at the other end thereof projecting from said gasket (G, G1) toward the axis (XX) thereof so s to engage said spigot (20) with said nose of said insert, the body portion (1) of said gasket being compressed radially between a chamber (16) of the first pipe (T1) and the spigot (20) of the second pipe (T2), and the annular heel (2) bearing on an annular receiving groove (18) at the entrance of the socket (15), and each insert (7) bearing against the annular receiving groove (18) with said head (9) with said gasket disposed therebetween and on the spigot (20) with said nose (11), wherein each insert (7) includes means for pivoting each insert about two pivot axes which are displaced from one another during the insertion of said spigot into said gasket and assumes an inclination relative to the axis (XX) of the gasket (G, G1) and of the coaxial pipes (T1, T2) which depends on the diametral production tolerances (d2, d3, d4) of the spigot (20) and therefore on the annular play (j2, j3, j4) between the spigot (20) and the receiving groove (18) of the socket (15).

10. Assembly according to claim 9, characterized in that each insert (7) bears with its head (9) against at least one contact point (A, B, C, E) of the receiving groove (18) with the gasket disposed therebetween, while at the same time being buttressed by means of its nose (11) on the spigot (20), assuming the optimum inclination relative to the axis (XX) of the gasket (G, G1) and of the pipes (T1, T2) as a result of rotation about one of two rotational pivots (R1, R2).

11. Assembly according to claim 9, characterized in that each insert 97) bears with its head (9) against at least contact points (A, B) of the socket entrance groove (18) with the gasket disposed therebetween, while at the same time being buttressed on the spigot (20) by means of its catching nose (11).

12. The assembly of claim 9, wherein each of said inserts has only one nose at said other end.

* * * * *